US008499852B2

(12) United States Patent
Chen

(10) Patent No.: US 8,499,852 B2

(45) Date of Patent: Aug. 6, 2013

(54) SWITCH FOR PNEUMATIC TOOL

(75) Inventor: Hsin-Chi Chen, Taichung (TW)

(73) Assignee: Tranmax Machinery Co., Ltd., Taichung (TW)

( * ) Notice: Subject to any disclaimer, the term of this patent is extended or adjusted under 35 U.S.C. 154(b) by 0 days.

(21) Appl. No.: 13/197,202

(22) Filed: Aug. 3, 2011

(65) Prior Publication Data

US 2012/0305819 A1 Dec. 6, 2012

(30) Foreign Application Priority Data

Jun. 2, 2011 (TW) ............................. 100119399 A

(51) Int. Cl.
*B23B 45/04* (2006.01)

(52) U.S. Cl.
USPC .............. 173/169; 251/83; 251/228; 251/339

(58) Field of Classification Search
USPC ...................... 251/83, 82, 339, 228; 173/169; 137/614.16–614.19
See application file for complete search history.

(56) References Cited

U.S. PATENT DOCUMENTS 4,258,799 A * 3/1981 Eckman ........................ 173/169
5,205,540 A * 4/1993 Clapp ........................... 251/339
5,788,219 A * 8/1998 Nakajima ..................... 251/339
6,027,099 A * 2/2000 Pusateri ........................ 251/339
6,443,239 B1 * 9/2002 Izumisawa .................... 173/169
7,032,881 B1 * 4/2006 Chiang .......................... 251/263
7,036,795 B2 * 5/2006 Izumisawa .................... 251/285
7,311,155 B2 * 12/2007 Chang ........................... 173/104
7,347,405 B2 * 3/2008 Liao ................................ 251/83
7,445,055 B2 * 11/2008 Pusateri et al. ............... 173/169
2002/0125021 A1 * 9/2002 Tseng ........................... 173/169
2006/0011366 A1 * 1/2006 Liao ............................. 173/169

* cited by examiner

*Primary Examiner* — John Bastianelli
*Assistant Examiner* — Andrew J Rost
(74) *Attorney, Agent, or Firm* — Muncy, Geissler, Olds & Lowe, PLLC

(57) ABSTRACT

Used in a pneumatic tool, a switch includes a valve seat set in an air intake passage and movable into contact with or away from a gas control member and defining an air hole, and a valve rod inserted through the air hole of the valve seat. When the positioning portion of the valve rod is stopped against the valve seat and the valve seat is stopped against the gas control member, the air intake passage is blocked. When the valve rod is biased relative to the valve seat, the positioning portion is moved away from the air hole of the valve seat for allowing a compressed gas to pass through the air hole, and when the valve rod is biased further to carry the valve seat away from the gas control member, the compressed gas is allowed to pass between the valve seat and the gas control member.

9 Claims, 4 Drawing Sheets

SWITCH FOR PNEUMATIC TOOL

BACKGROUND OF THE INVENTION

1. Field of the Invention

The present invention relates to pneumatic tools and more particularly, to a switch for use in a pneumatic tool.

2. Description of the Related Art

A pneumatic tool or air tool is a tool driven by a gas, usually compressed air supplied by a gas compressor for rotating a motor at a high speed to move a transmission mechanism in producing a high torque output for fastening or unfastening mechanical members.

However, when using the aforesaid pneumatic tool to provide a low torque output for a pre-fastening operation, the user must switch a speed control mechanism of the pneumatic tool to a low speed mode and then press the trigger. This operation manner is inconvenient and not easy to control. Further, when the gas pressure of the pneumatic tool is high during operation, the user must apply much effort to press down the trigger. Thus, the user is inclined to get tired easily, affecting the working efficiency.

SUMMARY OF THE INVENTION

The present invention has been accomplished under the circumstances in view. It is the main object of the present invention to provide a switch for pneumatic tool, which can control the revolving speed of the pneumatic tool in a stepped manner, facilitating the operation of the pneumatic tool to fit different applications or requirements and enhancing the working efficiency.

To achieve this and other objects of the present invention, a switch is used in a pneumatic tool having an air intake passage and a gas control member set in the air intake passage. The switch comprises a valve seat set in the air intake passage and movable into contact with or away from the gas control member and defining an air hole, and a valve rod inserted through the air hole of the valve seat and biasable to stop a positioning portion thereof against the air hole or to move the positioning portion away from the air hole. When the positioning portion of the valve rod is stopped against the valve seat and the valve seat is stopped against the gas control member, the air intake passage is blocked. When the valve rod is biased relative to the valve seat, the positioning portion is moved away from the air hole of the valve seat for allowing a compressed gas to pass through the air hole, and when the valve rod is biased further to carry the valve seat away from the gas control member, the compressed gas is allowed to pass between the valve seat and the gas control member.

Other advantages and features of the present invention will be fully understood by reference to the following specification in conjunction with the accompanying drawings, in which like reference signs denote like components of structure.

DETAILED DESCRIPTION OF THE INVENTION

Figure 1:
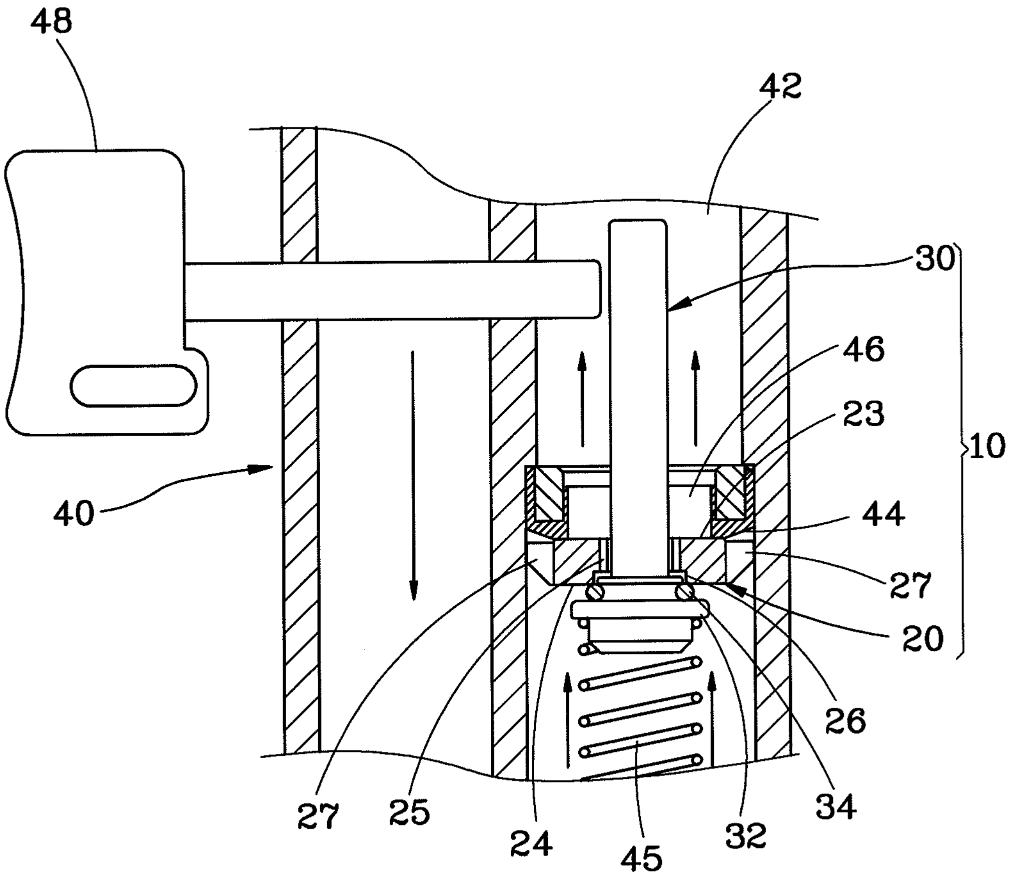
FIG. 1 is a schematic sectional view illustrating a switch installed in a pneumatic tool in accordance with the present invention.

Referring to FIG. 1, a switch 10 in accordance with the present invention is shown used in a pneumatic tool 40 comprising an air intake passage 42 and a gas control member 44 set in the air intake passage 42. The gas control member 44 defines a center through hole 46. When the gas control member 44 is set in the air intake passage 42, the center through hole 46 is kept in communication with the air intake passage 42. The switch 10 comprises a valve seat 20 and a valve rod 30.

Figure 2:
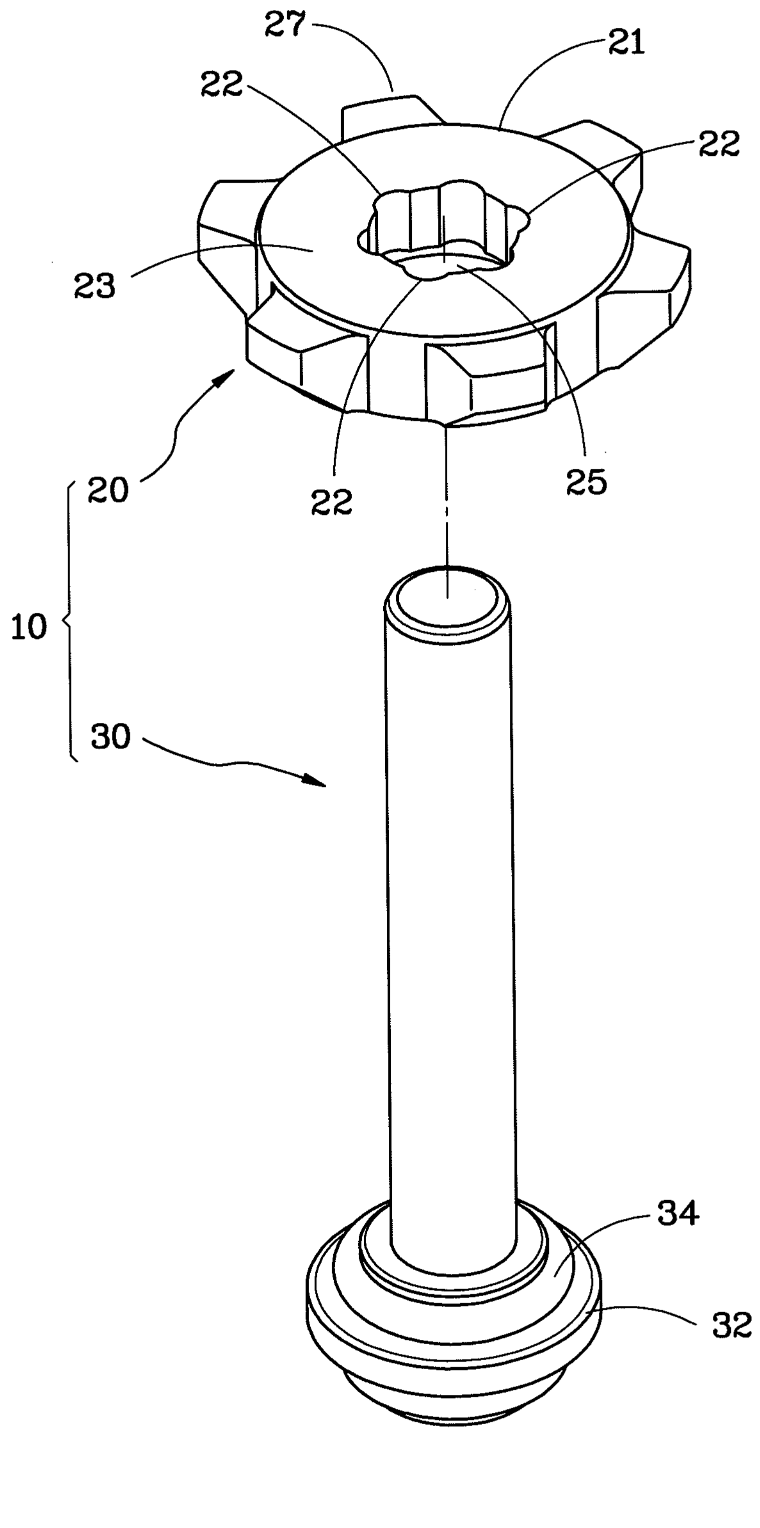
FIG. 2 is an elevational exploded view of the switch for pneumatic tool in accordance with the present invention.
Figure 3:
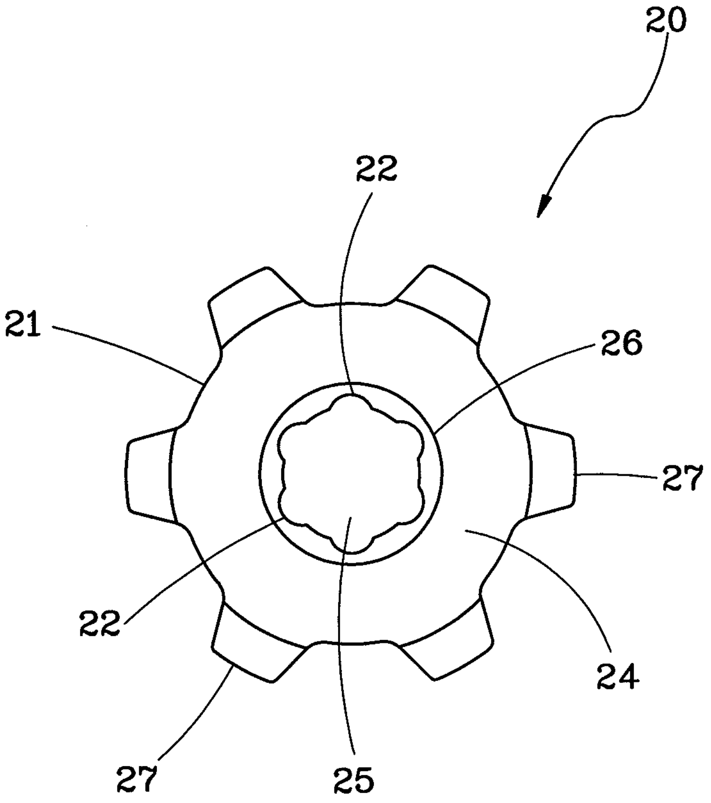
FIG. 3 is a top view of the valve seat of the switch for pneumatic tool in accordance with the present invention.

Referring to FIGS. 2 and 3, the valve seat 20 comprises an annular seat base 21. The annular seat base 21 comprises opposing top wall 23 and bottom wall 24, and a plurality of grooves 22 equiangularly spaced around the inside wall thereof and extending from the top wall 23 to the bottom wall 24. Thus, the center and grooves 22 of annular seat base 21 form an air hole 25. The annular seat base 21 further comprises a shoulder 26 located on the bottom wall 24 in a coaxial manner relative to the air hole 25, and a plurality of protruding portions 27 spaced around the periphery for controlling tilting of the valve seat 20 in the air intake passage 42.

The valve rod 30 comprises a disk-like positioning portion 32 located on one end thereof. Further, a seal member 34 is attached to the disk-like positioning portion 32 of the valve rod 30. The seal member 34 can be an O-ring or rubber gasket ring, or any flexible member made of a flexible material. The diameter of the valve rod 30 is slightly smaller than the inner diameter of the annular seat base 21 of the valve seat 20. The valve rod 30 is inserted upwardly through the air hole 25 of annular seat base 21, and biasable relative to the valve seat 20 to stop the seal member 34 against the shoulder 26 of the valve seat 20 or to move the seal member 34 away from the shoulder 26 of the valve seat 20.

When installing the switch 10 in the air intake passage 42 of the pneumatic tool 40, as shown in FIG. 1, set a spring member 45 between the positioning portion 32 of the valve rod 30 and an inside wall of the air intake passage 42, enabling the spring member 45 to impart an upward pressure to the valve rod 30 and the valve seat 20 relative to the pneumatic tool 40 to force the top wall 23 of the valve seat 20 against the gas control member 44 and the seal member 34 against the shoulder 26 of the valve seat 20. At this time, the center through hole 46 of the gas control member 44 and the air hole 25 of annular seat base 21 are sealed, stopping the compressed gas of the pneumatic tool 40 from entering the air intake passage 42.

Figure 4:
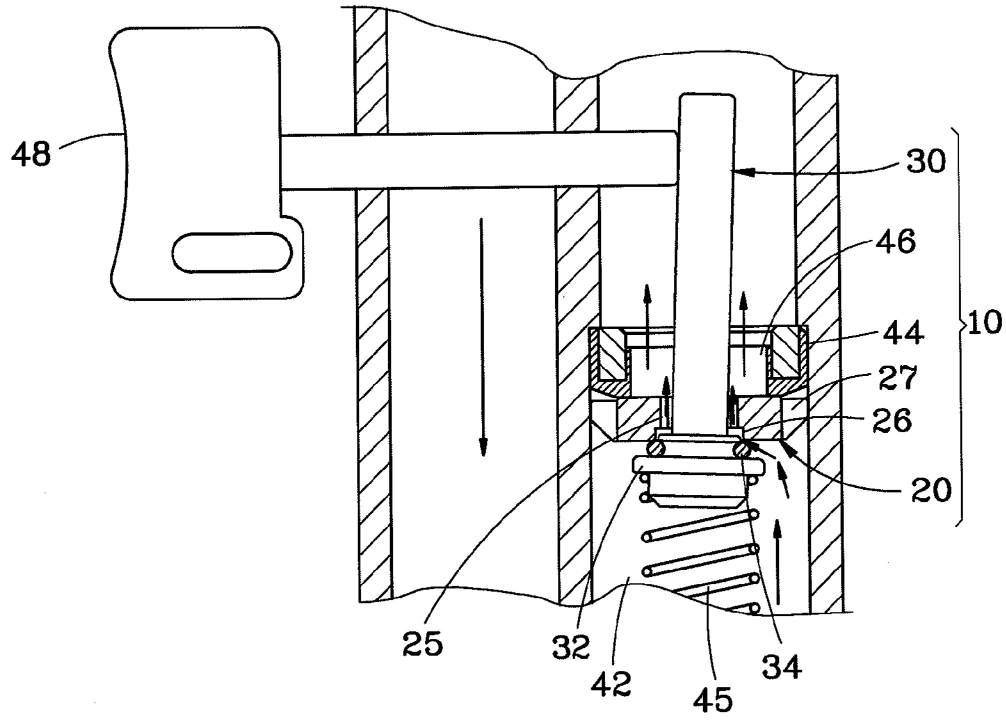
FIG. 4 is a schematic applied view of the present invention, illustrating the valve rod biased relative to the valve seat.

Referring to FIG. 4, when the user presses a trigger 48 of the pneumatic tool 40 to move a short distance, the trigger 48 biases the valve rod 30 through a small angle without moving the valve seat 20, causing the seal member 34 to be moved away from the shoulder 26 of the valve seat 20 for allowing a compressed gas from a compressed gas source (not shown) to go through the grooves 22 of the valve seat 20 and the center through hole 46 of the gas control member 44 into the air intake passage 42. At this time, the flow rate of the compressed gas passing through the air hole 25 of annular seat base 21 for driving the pneumatic tool 40 is low, and therefore the pneumatic tool 40 is rotated at a low speed, facilitating screw bolt pre-fastening operation.

Figure 5:
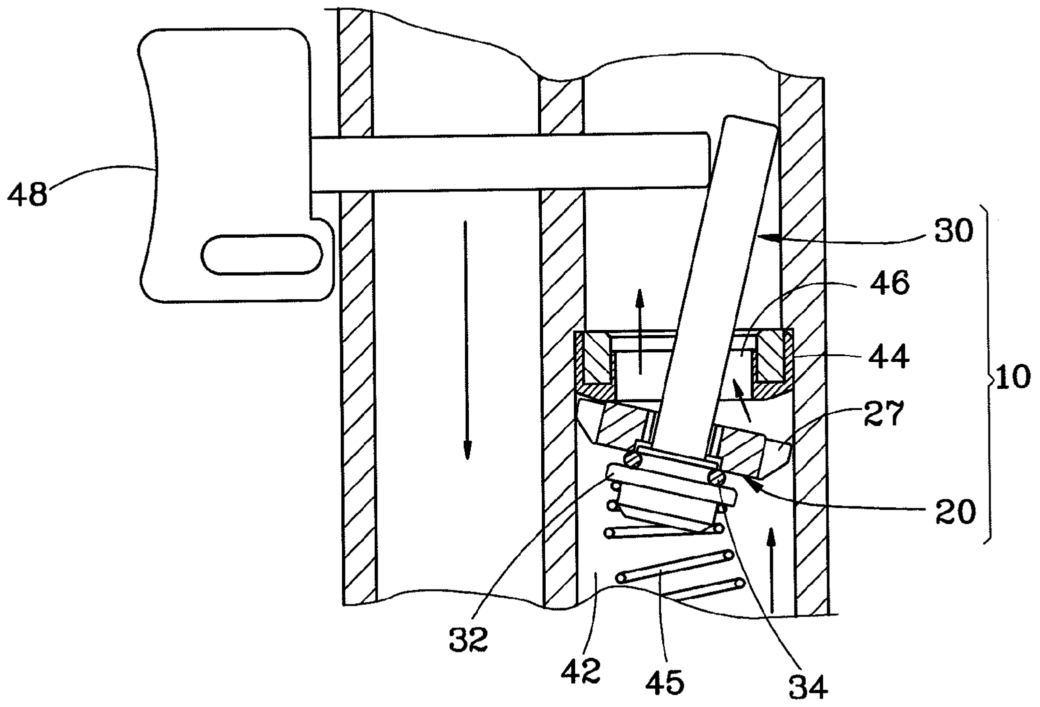
FIG. 5 is another schematic applied view of the present invention, illustrating the valve seat moved with the valve rod away from the gas control member of the pneumatic tool.

Referring to FIG. 5, when the user pressed down the trigger 48 to the limit, the triggers 48 biases the valve rod 30 through a large angle, causing the valve rod 30 to move the valve seat 20 away from gas control member 44 for allowing the compressed gas to go through the grooves 22 of the valve seat 20 and the center through hole 46 of the gas control member 44 into the air intake passage 42 at a high flow rate, and therefore the pneumatic tool 40 is rotated at a high speed, facilitating normal fastening or unfastening operation.

As the valve rod 30 can steppedly bias the valve seat 20 at first and then carry the valve seat 20 away from the gas control member 44, the invention can control the flow rate of the applied compressed gas passing through the air intake passage 42 to drive the pneumatic tool 40 at a low speed or high speed to fit different applications or operating requirements. Further, if the gas pressure of the pneumatic tool 40 is high (for example, 13 kg/$cm^2$) during operation, the stepped driving function of the present invention enables the user to operate the pneumatic tool with less effort, preventing fatigue and enhancing the working efficiency.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A switch used in a pneumatic tool comprising an air intake passage and a gas control member set in said air intake passage, the switch comprising:

a valve seat defining an air hole, said valve seat being set in said air intake passage and movable relative to said air intake passage into contact with or away from said gas control member; and a valve rod comprising a positioning portion, said valve rod being inserted through said air hole of said valve seat and biasable relative to said valve seat to stop said positioning portion against said air hole or to move said positioning portion away from said air hole;

wherein when said positioning portion of said valve rod is stopped against said valve seat and said valve seat is stopped against said gas control member, said air intake passage is blocked; when said valve rod is biased relative to said valve seat, said positioning portion is moved away from said air hole of said valve seat for allowing a compressed gas to pass through said air hole, and when said valve rod is biased further to carry said valve seat away from said gas control member, said compressed gas is allowed to pass between said valve seat and said gas control member, wherein said valve seat comprises an annular seat base, said air hole is at a center of said annular seat base to form an inside wall of said annular seat base which extends around said air hole, said annular seat base comprises at least one groove located on the inside wall.

2. The switch as claimed in claim 1, wherein said valve seat comprises a shoulder disposed in a coaxial manner relative to said air hole; said positioning portion of said valve rod is stoppable against said shoulder.

3. The switch as claimed in claim 2, wherein said shoulder of said valve seat is formed from a depression in a bottom wall of said valve seat.

4. The switch as claimed in claim 1, wherein said positioning portion of said valve rod is attached with a seal member.

5. The switch as claimed in claim 4, wherein said seal member is selected from the group of O-ring, rubber gasket ring and flexible materials.

6. The switch as claimed in claim 4, wherein the seal member is located between the positioning portion and the valve seat.

7. The switch as claimed in claim 1, wherein said valve seat further comprises at least one protruding portion located on the periphery thereof for stopping against a peripheral wall of said air intake passage.

8. The switch as claimed in claim 1, further comprising a spring member set between said valve rod and an inside wall of said air intake passage.

9. The switch as claimed in claim 1, wherein no more than six grooves are located on the inside wall of the annular sear base.

* * * * *